United States Patent
Kuo (10) Patent No.: US 10,383,120 B2
(45) Date of Patent: Aug. 13, 2019

(54) DEVICE AND METHOD OF REPORTING CHANNEL INFORMATION ACCORDING TO BEAMFORMING

(71) Applicant: ACER INCORPORATED, New Taipei (TW)

(72) Inventor: Ping-Heng Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 313 days.

(21) Appl. No.: 15/149,197

(22) Filed: May 9, 2016

(65) Prior Publication Data

US 2016/0338064 A1 Nov. 17, 2016

Related U.S. Application Data

(60) Provisional application No. 62/159,360, filed on May 11, 2015.

(51) Int. Cl.
*H04W 72/04* (2009.01)
*H04L 5/00* (2006.01)
*H04W 72/00* (2009.01)
*H04B 7/06* (2006.01)

(52) U.S. Cl.
CPC ...... *H04W 72/0453* (2013.01); *H04B 7/0617* (2013.01); *H04B 7/0632* (2013.01); *H04B 7/0639* (2013.01); *H04L 5/0051* (2013.01); *H04L 5/0057* (2013.01); *H04W 72/005* (2013.01)

(58) Field of Classification Search
CPC ..................................................... H04W 72/04
See application file for complete search history.

(56) References Cited

U.S. PATENT DOCUMENTS

| | | | |
|---|---|---|---|
| 2013/0235742 A1* | 9/2013 | Josiam | H04W 24/10 370/252 |
| 2013/0258972 A1 | 10/2013 | Kim | |
| 2013/0301454 A1 | 11/2013 | Seol | |
| 2014/0036713 A1 | 2/2014 | Hugl | |
| 2014/0078919 A1 | 3/2014 | Hammarwall | |
| 2014/0192917 A1 | 7/2014 | Nam | |
| 2014/0211731 A1* | 7/2014 | Inoue | H04B 7/0456 370/329 |
| 2014/0293803 A1 | 10/2014 | Wang | |

FOREIGN PATENT DOCUMENTS

WO 2013133672 A1 9/2013

\* cited by examiner

*Primary Examiner* — Sulaiman Nooristany
(74) *Attorney, Agent, or Firm* — Winston Hsu (57) ABSTRACT

A communication device of reporting channel information comprises a storage unit for storing instructions and a processing means coupled to the storage unit. The processing means is configured to execute the instructions stored in the storage unit. The instructions comprise receiving a plurality of beamformed reference signals transmitted by a network via a plurality of beams, respectively; obtaining a plurality of channel quality indicators (CQIs) of the plurality of beams according to the plurality of beamformed reference signals; and transmitting a bitmap indicating whether the plurality of CQIs are greater than a threshold to the network.

8 Claims, 10 Drawing Sheets

DEVICE AND METHOD OF REPORTING CHANNEL INFORMATION ACCORDING TO BEAMFORMING

CROSS REFERENCE TO RELATED APPLICATIONS

This application claims the benefit of U.S. Provisional Application No. 62/159,360, filed on May 11, 2015, which is incorporated herein by reference.

BACKGROUND OF THE INVENTION

1. Field of the Invention

The present invention relates to a communication device and a method used in a wireless communication system, and more particularly, to a communication device and a method of reporting channel information according to beamforming in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (COMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

In addition, beamforming is proposed to further improve the performance of the wireless communication system. In this situation the UE may receive a large amount of reference signals transmitted by the eNB according to the beamforming. Accordingly, the UE needs to report a large amount of channel information to the eNB by using the reference signals. The performance improvement provided by the beamforming is degraded due to overhead caused by the reporting of the channel information.

Thus, how to report the channel information according to the beamforming is realized is an important problem to be solved.

SUMMARY OF THE INVENTION

The present invention therefore provides a method and related communication device for reporting channel information according to beamforming to solve the abovementioned problem.

A communication device of reporting channel information comprises a storage unit for storing instructions and a processing means coupled to the storage unit. The processing means is configured to execute the instructions stored in the storage unit. The instructions comprise receiving a plurality of beamformed reference signals transmitted by a network via a plurality of beams, respectively; obtaining a plurality of channel quality indicators (CQIs) of the plurality of beams according to the plurality of beamformed reference signals; and transmitting a bitmap indicating whether the plurality of CQIs are greater than a threshold to the network.

A communication device of reporting channel information comprises a storage unit for storing instructions and a processing means coupled to the storage unit. The processing means is configured to execute the instructions stored in the storage unit. The instructions comprise receiving a plurality of beamformed reference signals transmitted by a network via a plurality of beams, respectively; obtaining a plurality of channel quality indicators (CQIs) of the plurality of beams according to the plurality of beamformed reference signals; selecting a beam from the plurality of beams according to the plurality of CQIs; transmitting a beam index of the beam to the network; and transmitting an indicator indicating whether a CQI of the beam is greater than a threshold to the network A communication device of reporting channel information comprises a storage unit for storing instructions and a processing means coupled to the storage unit. The processing means is configured to execute the instructions stored in the storage unit. The instructions comprise receiving a plurality of beamformed reference signals transmitted by a network via a plurality of beams, respectively; obtaining a plurality of channel quality indicators (CQIs) of the plurality of beams according to the plurality of beamformed reference signals; selecting a beam from the plurality of beams according to the plurality of CQIs; transmitting a beam index of the beam to the network; transmitting a channel state information (CSI) of the beam to the network; and transmitting information of at least one neighboring beam of the beam to the network.

A communication device of reporting channel information comprises a storage unit for storing instructions and a processing means coupled to the storage unit. The processing means is configured to execute the instructions stored in the storage unit. The instructions comprise receiving a plurality of beamformed reference signals transmitted by a network via a plurality of beams, respectively, wherein the plurality of beams belong to at least one beam group; obtaining a plurality of channel quality indicators (CQIs) of the plurality of beams according to the plurality of beamformed reference signals; selecting a beam group from the plurality of beams according to the plurality of CQIs; transmitting a group index of the beam group to the network; determining an aggregated CSI according to that a joint data transmission is performed via at least one beam of the beam group; and transmitting the aggregated CSI to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
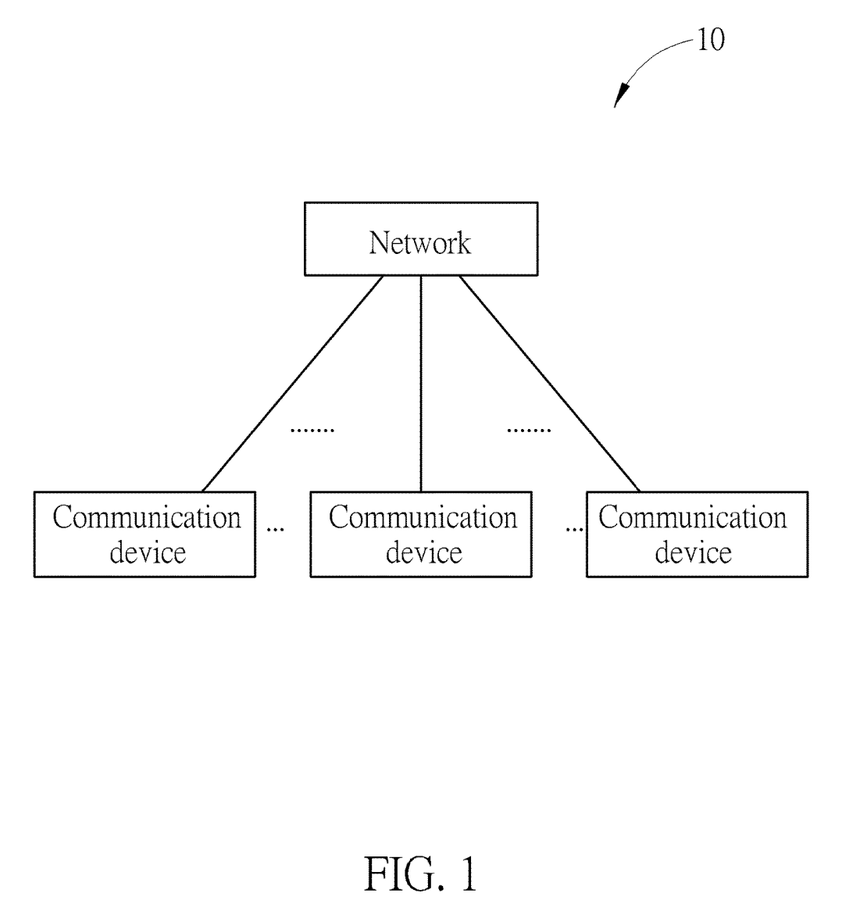
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

The network and the communication device may communicate with each other according to beamforming. For example, the network may transmit multiple (e.g., beamformed) reference signals (e.g., channel state information (CSI) reference signals (CSI-RSs)) to a communication device via multiple beams (i.e., in multiple beam sectors). The beams may cover geographical areas, respectively, which may be partly overlapped or nonoverlapped. Accordingly, the communication device may report channel information (e.g., channel state information (CSI)) according to all or part of the reference signals.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to its direction (i.e., transmission direction), e.g., for an uplink (UL), the communication device is the transmitter and the network is the receiver, and for a downlink (DL), the network is the transmitter and the communication device is the receiver.

Figure 2:
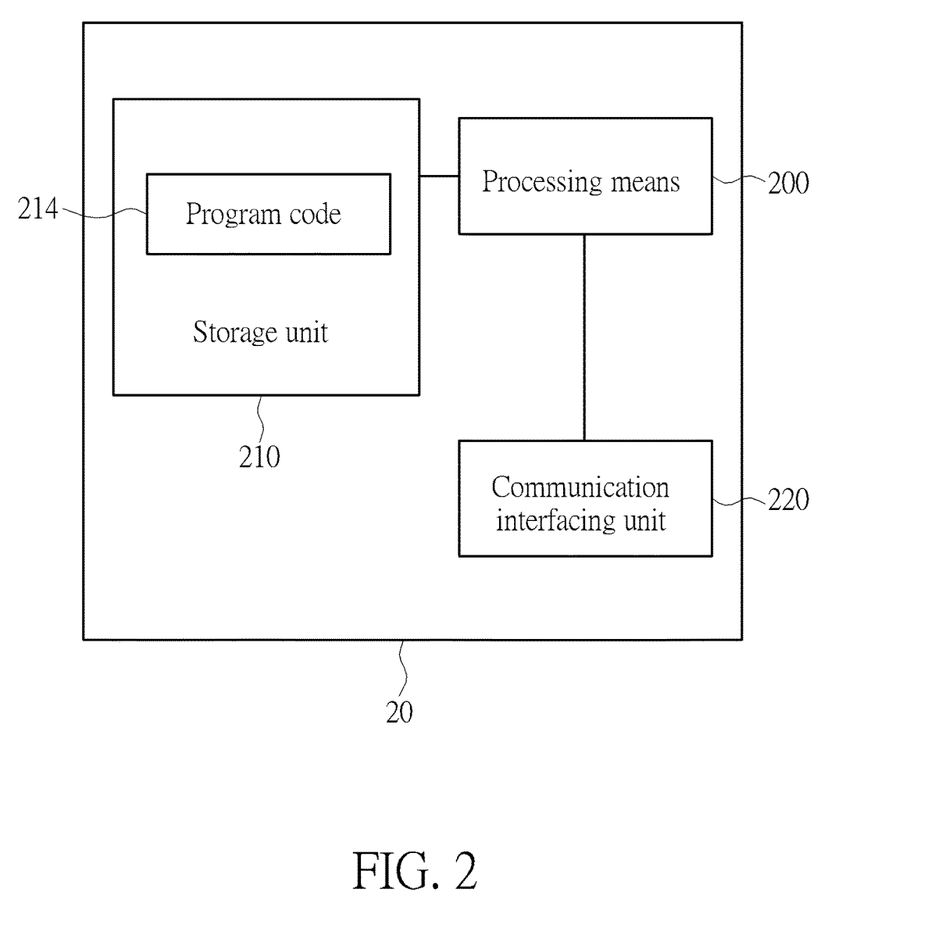
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
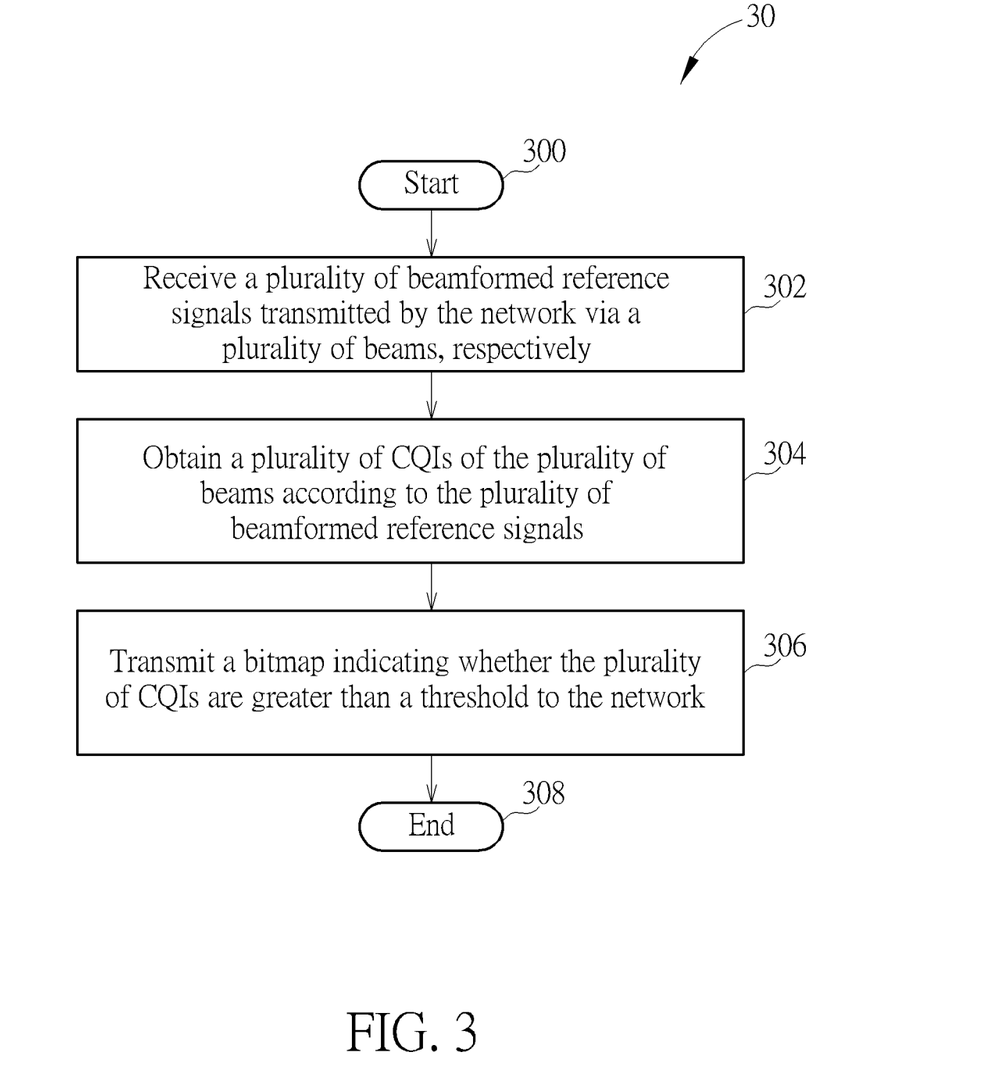
FIG. 3 is a flowchart of a process according to an example of the present invention.

FIG. 3 is a flowchart of a process 30 according to an example of the present invention. The process 30 may be utilized in a communication device shown in FIG. 1, to report channel information to the network (e.g., eNB). The process 30 may be compiled into the program code 214 and includes the following steps:

Step 300: Start.

Step 302: Receive a plurality of beamformed reference signals transmitted by the network via a plurality of beams, respectively.

Step 304: Obtain a plurality of channel quality indicators (CQIs) of the plurality of beams according to the plurality of beamformed reference signals.

Step 306: Transmit a bitmap indicating whether the plurality of CQIs are greater than a threshold to the network.

Step 308: End.

According to the process 30, the communication device may receive a plurality of beamformed reference signals (e.g., CSI-RSs) transmitted by the network via a plurality of beams, respectively. Then, the communication device may obtain a plurality of CQIs of the plurality of beams according to the plurality of beamformed reference signals, and may transmit a bitmap indicating whether the plurality of CQIs are greater than a threshold to the network. That is, the communication device may not transmit all the channel information obtained according to the reference signals, but may simply indicate whether the CQIs are greater than the threshold to the network. Thus, overhead for transmitting the channel information is reduced, and scheduling performance is improved.

Realization of the present invention is not limited to the above description.

A method according to which the threshold is determined is not limited. In one example, the communication device may receive the threshold from the network via a unicast transmission, a multicast transmission or a broadcast transmission. In one example, the threshold may be predetermined in the communication device, or may be triggered by an event.

Figure 4:
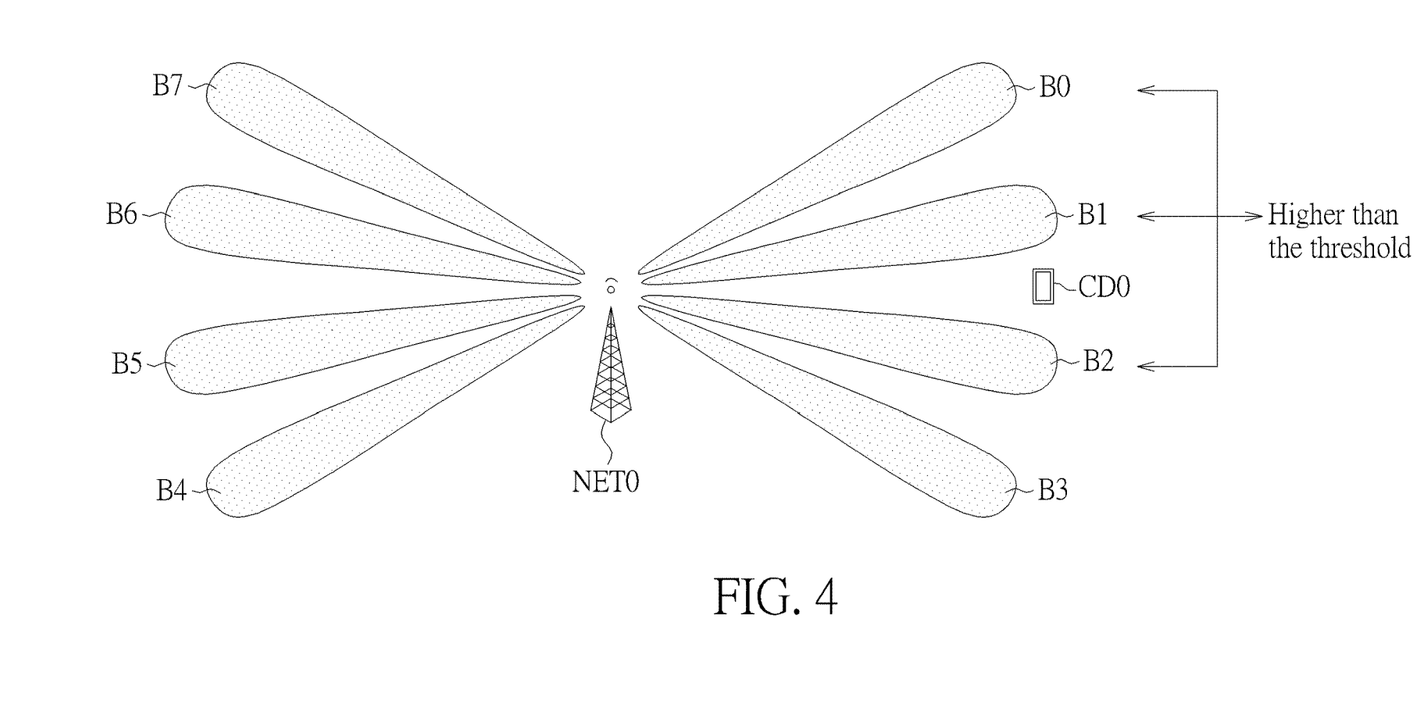
FIG. 4 is a schematic diagram of transmissions of reference signals via beams according to an example of the present invention.

FIG. 4 is a schematic diagram of transmissions of reference signals via beams according to an example of the present invention. In FIG. 4, a network NET0 transmits reference signals to a communication device CD0 via beams B0-B7. The communication device CD0 measures the reference signals, and obtains CQIs CQI0-CQI7 according to the reference signals received via the beams B0-B7, respectively. In the present example, the CQIs CQI0-CQI2 obtained based on the reference signals received via the beams B0-B2 are greater than the threshold. The communication device CD0 generates a bitmap "1110000" indicating the result, and transmits the bitmap to the network NET0. Thus, the network NET0 knows that the CQIs CQI0-CQI2 are better than the threshold after receiving the bitmap, and is able to schedule the communication device CD0 according to the bitmap.

In one example, the communication device may determine difference information according to the threshold and the plurality of CQIs, and may transmit the difference information of the plurality of differential CQIs to the network. That is, the communication device may provide additional information related to the CQIs to the network. Further, the difference information may indicate a difference between the threshold and an aggregated CQI, wherein the aggregated CQI may be determined according to that a joint data transmission is performed via at least one beam (e.g., selected beam(s)) corresponding to a set of the plurality of CQIs greater than the threshold. That is, the aggregated CQI may be seemed as an equivalent CQI derived under the assumption that the joint data transmission is performed via the at least one beam. In another example, the difference information may indicate a difference between the threshold and an average of the plurality of CQIs. In another example, the difference information may indicate at least one of difference between the threshold and a set of the plurality of CQIs, wherein the set of the plurality of CQIs is greater than the threshold. That is, the difference (s) between the selected beam(s) with better CQI(s) is also transmitted to the network.

Taking FIG. 4 as an example, the communication device CD0 not only transmits the bitmap to the network NET0, but also transmits the difference information to the network NET0. The difference information may be determined according to the CQIs CQI0-CQI2 and the threshold, as illustrated previously. Thus, the network NET0 can schedule the communication device CD0 according to both the bitmap and the difference information. As a result, better scheduling performance can be achieved.

Figure 5:
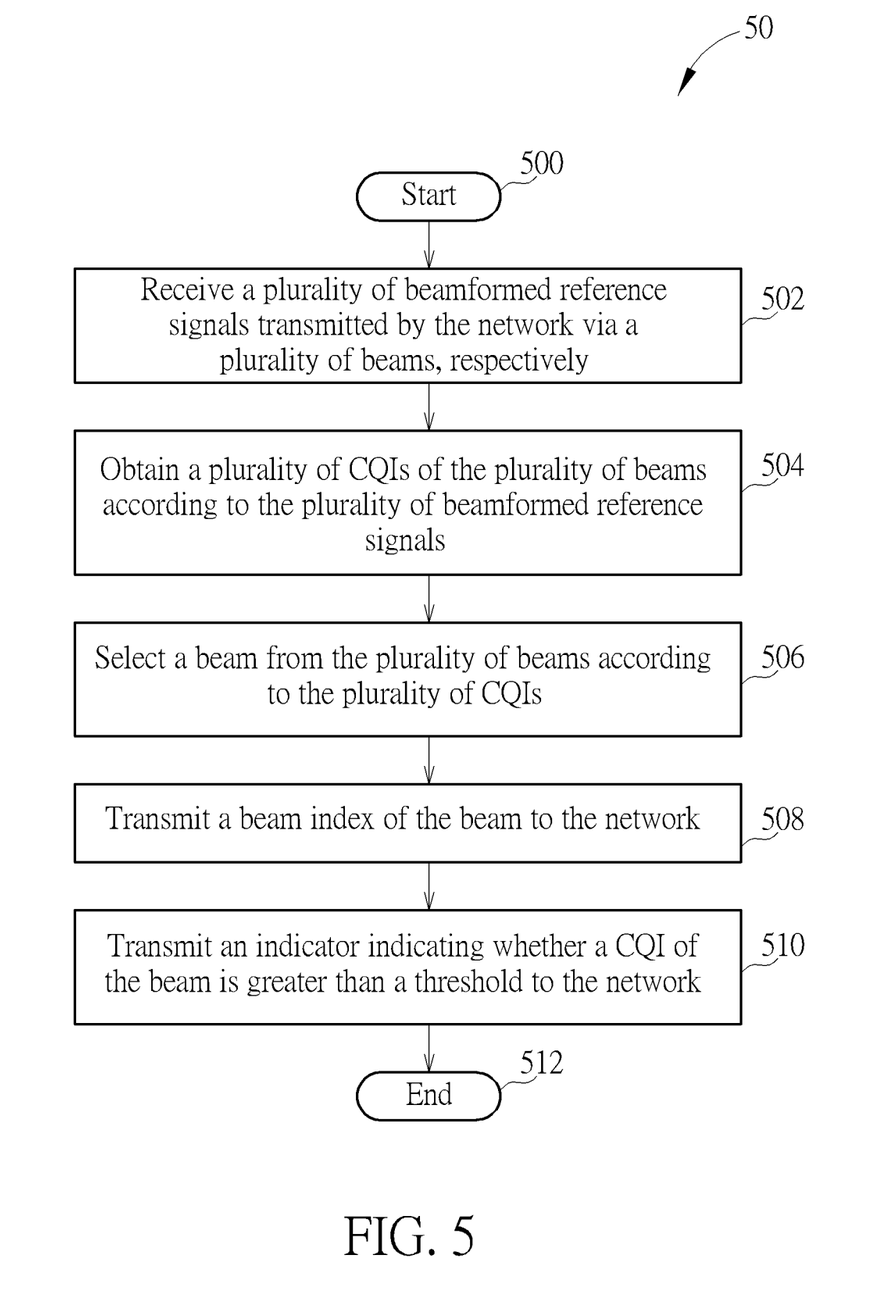
FIG. 5 is a flowchart of a process according to an example of the present invention.

FIG. 5 is a flowchart of a process 50 according to an example of the present invention. The process 50 may be utilized in a communication device shown in FIG. 1, to report channel information to the network (e.g., eNB). The process 50 may be compiled into the program code 214 and includes the following steps:

Step 500: Start.

Step 502: Receive a plurality of beamformed reference signals transmitted by the network via a plurality of beams, respectively.

Step 504: Obtain a plurality of CQIs of the plurality of beams according to the plurality of beamformed reference signals.

Step 506: Select a beam from the plurality of beams according to the plurality of CQIs.

Step 508: Transmit a Beam Index of the Beam to the Network.

Step 510: Transmit an indicator indicating whether a CQI of the beam is greater than a threshold to the network.

Step 512: End.

According to the process 50, the communication device may receive a plurality of beamformed reference signals (e.g., CSI-RSs) transmitted by the network via a plurality of beams, respectively. Then, the communication device may obtain a plurality of CQIs of the plurality of beams according to the plurality of beamformed reference signals. The communication device may select a beam from the plurality of beams according to the plurality of CQIs. The communication device may transmit a beam index of the beam to the network, and may transmit an indicator indicating whether a CQI of the beam is greater than a threshold to the network. That is, the communication device may not transmit all the channel information obtained according to the reference signals, but may simply provide only one CQI and whether the CQI is greater than the threshold to the network. Thus, overhead for transmitting the channel information is reduced, and performance of the wireless communication system is improved.

Realization of the present invention is not limited to the above description.

In one example, the CQI is a highest CQI in the plurality of CQIs. That is, only the best CQI is indicated to the network. A method according to which the threshold is determined is not limited. In one example, the communication device may receive the threshold from the network via a unicast transmission, a multicast transmission or a broadcast transmission. In one example, the threshold may be predetermined in the communication device, or may be triggered by an event. In addition, the communication device may transmit a differential CQI indicating a difference between the threshold and the CQI of the beam to the network. That is, the communication device may provide additional information related to the CQI to the network.

Figure 6:
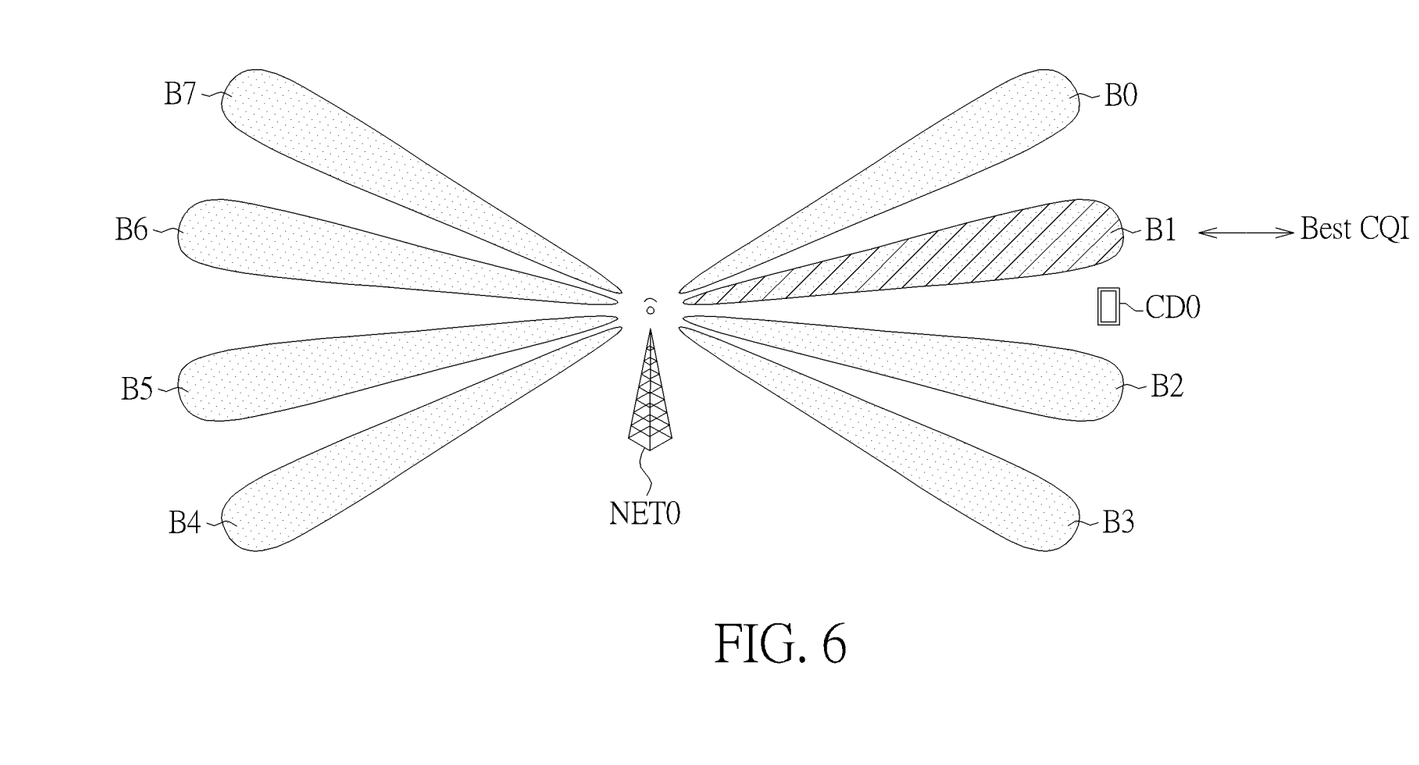
FIG. 6 is a schematic diagram of transmissions of reference signals via beams according to an example of the present invention.

FIG. 6 is a schematic diagram of transmissions of reference signals via beams according to an example of the present invention. In FIG. 6, a network NET0 transmits reference signals to a communication device CD0 via beams B0-B7. The communication device CD0 measures the reference signals, and obtains CQIs CQI0-CQI7 according to the reference signals received via the beams B0-B7, respectively. In the present example, the CQI CQI1 is the best CQI among the CQIs CQI0-CQI7. The communication device CD0 generates a beam index "001" indicating the CQI CQI1, and transmits the beam index to the network NET0. In addition, the communication device CD0 may transmit a one-bit indicator "1" indicating that the CQI CQI1 is greater than the threshold. Thus, the network NET0 knows that the CQI CQI1 is the best CQI and is greater than the threshold, after receiving the beam index and the indicator. Accordingly, the network NET0 is able to schedule the communication device CD0 according to the beam index and the indicator.

Figure 7:
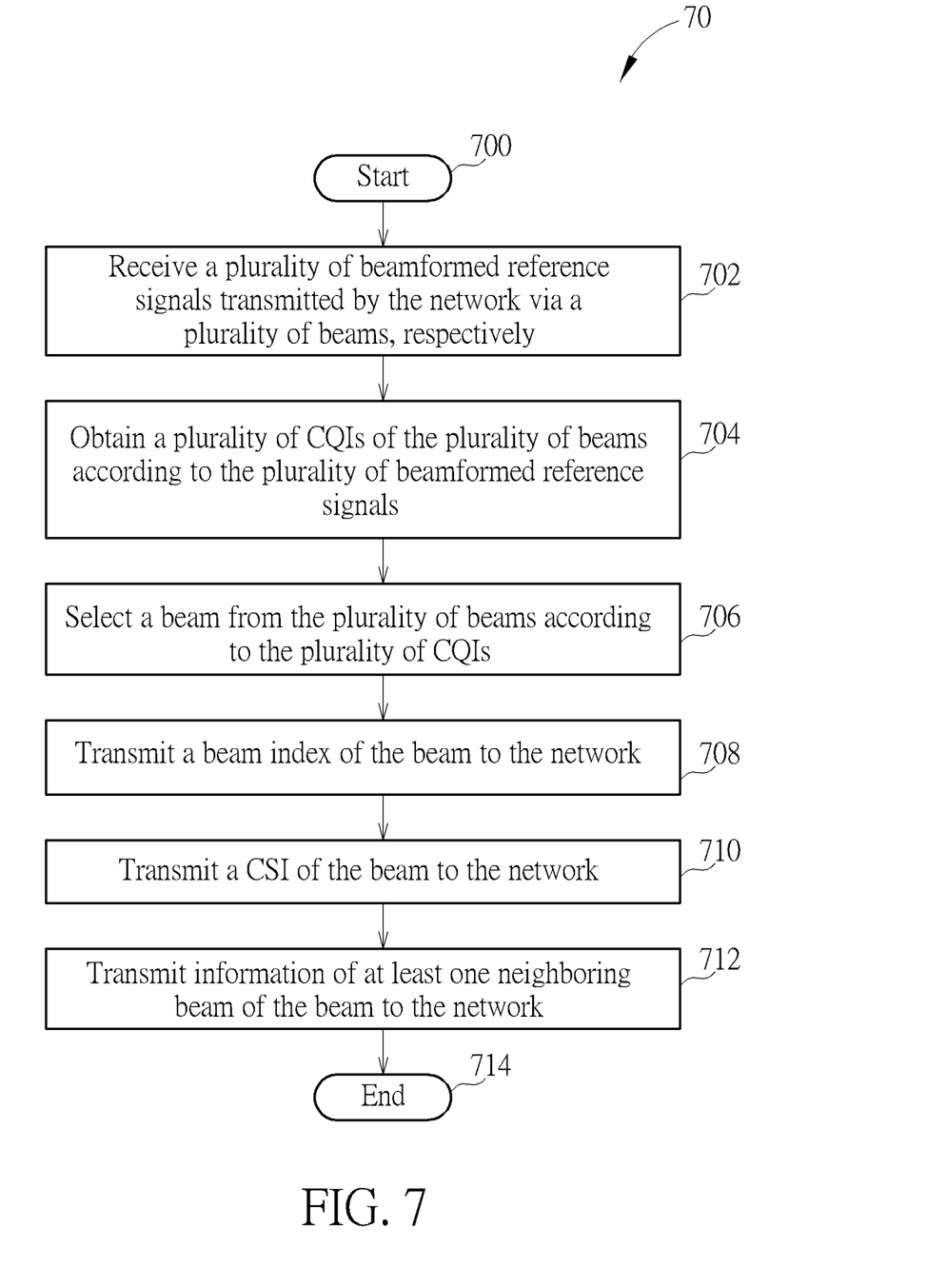
FIG. 7 is a flowchart of a process according to an example of the present invention.

FIG. 7 is a flowchart of a process 70 according to an example of the present invention. The process 70 may be utilized in a communication device shown in FIG. 1, to report channel information to the network (e.g., eNB). The process 70 may be compiled into the program code 214 and includes the following steps:

Step 700: Start.
Step 702: Receive a plurality of beamformed reference signals transmitted by the network via a plurality of beams, respectively.
Step 704: Obtain a plurality of CQIs of the plurality of beams according to the plurality of beamformed reference signals.
Step 706: Select a beam from the plurality of beams according to the plurality of CQIs.
Step 708: Transmit a beam index of the beam to the network.
Step 710: Transmit a CSI of the beam to the network.
Step 712: Transmit information of at least one neighboring beam of the beam to the network.
Step 714: End.

According to the process 70, the communication device may receive a plurality of beamformed reference signals (e.g., CSI-RSs) transmitted by the network via a plurality of beams, respectively. Then, the communication device may obtain a plurality of CQIs of the plurality of beams according to the plurality of beamformed reference signals. The communication device may select a beam from the plurality of beams according to the plurality of CQIs. The communication device may transmit a beam index of the beam to the network, and may transmit a CSI of the beam to the network. In addition, the communication device may transmit information of at least one neighboring beam of the beam to the network. That is, the communication device not only transmits the beam index and the CSI of the beam to the network, but also transmits the information of at least one neighboring beam of the beam to the network. Thus, the network can schedule the communication device according to more information, and better scheduling performance can be achieved.

Realization of the present invention is not limited to the above description.

In one example, the beam may correspond to a highest CQI in the plurality of CQIs. That is, only the beam corresponding to the best CQI is indicated to the network. In one example, the CSI may include at least one of a rank indicator (RI) of the beam, a precoding matrix indicator (PMI) of the beam, and a CQI of the beam.

Content of the information of at least one neighboring beam is not limited. In one example, the information of the at least one neighboring beam may include at least one CSI of the at least one neighboring beam. That is, the CSI (s) of the neighboring beam (s) is transmitted to the network. In one example, the information of the at least one neighboring beam may include at least one difference between the beam and at least one CQI of the at least one neighboring beam. That is, the difference (s) between the CQI of the beam and the CQI (s) of the neighboring beam (s) is transmitted to the network. In one example, the information of the at least one neighboring beam may include an aggregated CSI determined according to that a joint data transmission is performed via the beam and the at least one neighboring beam. That is, the aggregated CQI may be seemed as an equivalent CQI derived under the assumption that the joint data transmission is performed via the beam and the at least one neighboring beam.

Figure 8:
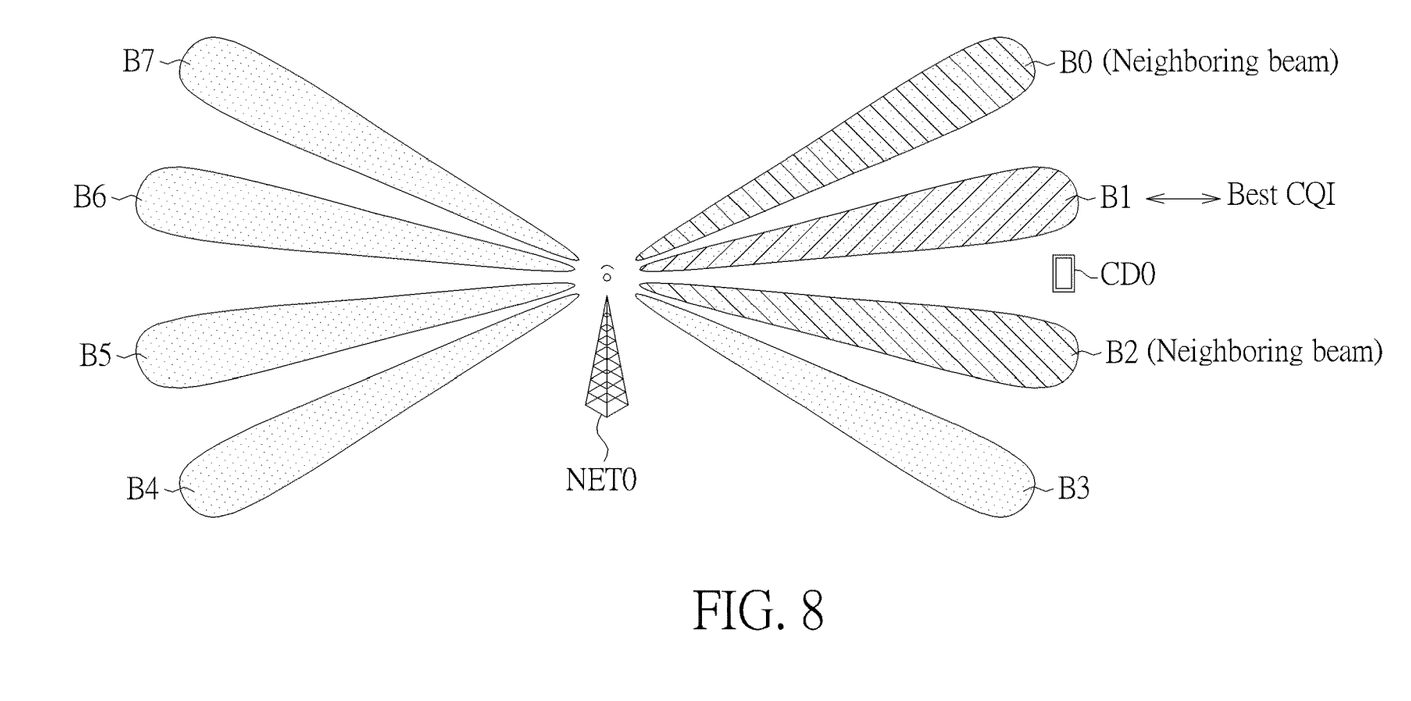
FIG. 8 is a schematic diagram of transmissions of reference signals via beams according to an example of the present invention.

FIG. 8 is a schematic diagram of transmissions of reference signals via beams according to an example of the present invention. In FIG. 8, a network NET0 transmits reference signals to a communication device CD0 via beams B0-B7. The communication device CD0 measures the reference signals, and obtains CQIs CQI0-CQI7 according to the reference signals received via the beams B0-B7, respectively. In the present example, the CQI CQI1 is the best CQI among the CQIs CQI0-CQI7. The communication device CD0 selects the beam B1 according to the process 70, and transmits a beam index of the beam B1 to the network NET0. In addition, the communication device CD0 transmits a CSI of the beam. B1 to the network NET0, and transmits information of the beams B0 and B2 (i.e., neighboring beams) to the network NET0. Thus, the network NET0 knows that the CQI CQI1 is the best CQI and knows the information of the neighboring beams, and is able to schedule the communication device CD0 according to the received information.

Figure 9:
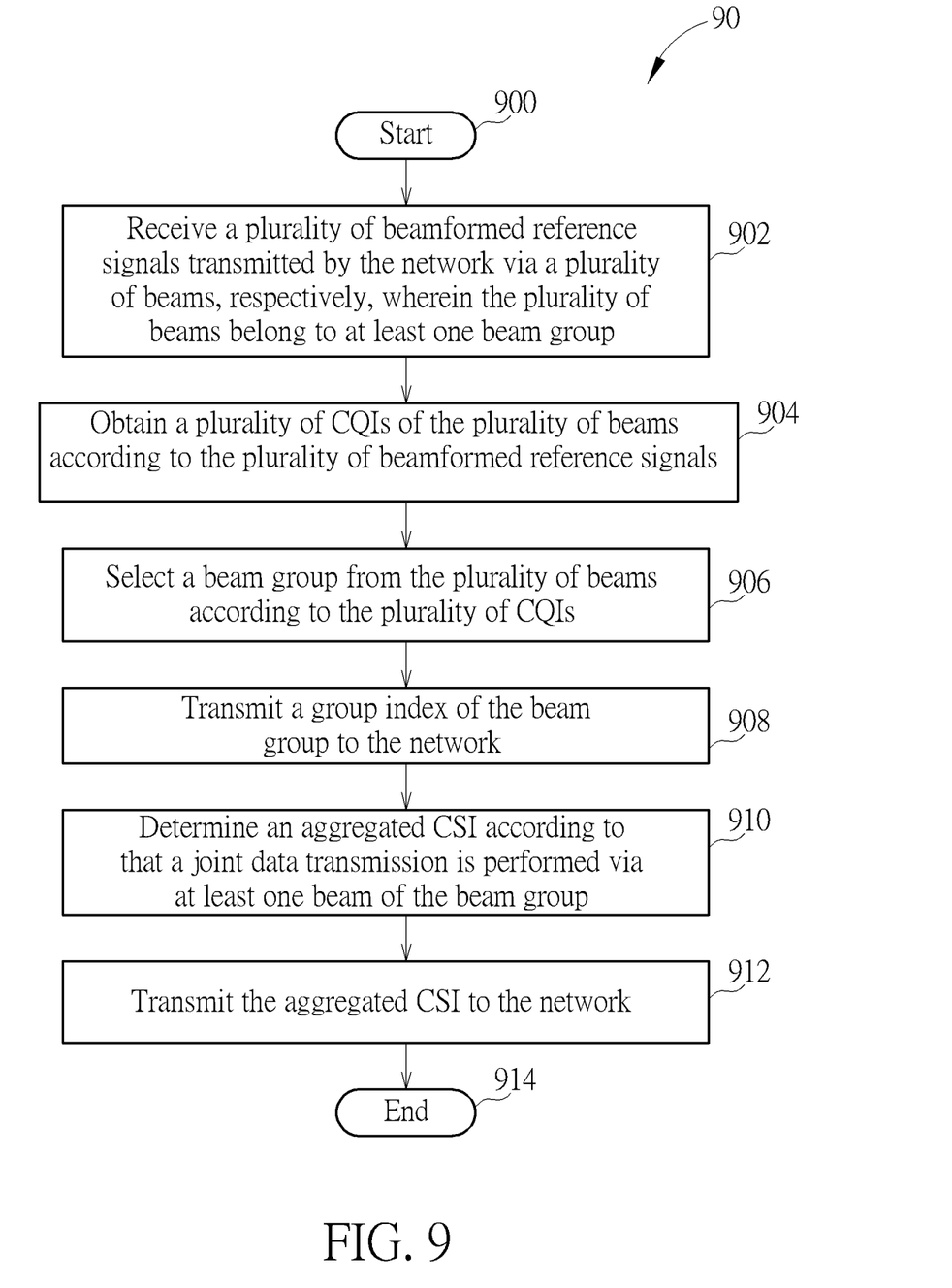
FIG. 9 is a flowchart of a process according to an example of the present invention.

FIG. 9 is a flowchart of a process 90 according to an example of the present invention. The process 90 may be utilized in a communication device shown in FIG. 1, to report channel information to the network (e.g., eNB). The process 90 may be compiled into the program code 214 and includes the following steps:

Step 900: Start.
Step 902: Receive a plurality of beamformed reference signals transmitted by the network via a plurality of beams, respectively, wherein the plurality of beams belong to at least one beam group.
Step 904: Obtain a plurality of CQIs of the plurality of beams according to the plurality of beamformed reference signals.
Step 906: Select a beam group from the plurality of beams according to the plurality of CQIs.
Step 908: Transmit a group index of the beam group to the network.
Step 910: Determine an aggregated CSI according to that a joint data transmission is performed via at least one beam of the beam group.
Step 912: Transmit the aggregated CSI to the network.
Step 914: End.

According to the process 90, the communication device may receive a plurality of beamformed reference signals transmitted by the network via a plurality of beams, respectively, wherein the plurality of beams belong to at least one beam group. Then, the communication device may obtain a plurality of CQIs of the plurality of beams according to the plurality of beamformed reference signals. The communication device may select a beam group from the plurality of beams according to the plurality of CQIs, and may transmit a group index of the beam group to the network. In addition, the communication device may determine an aggregated CSI according to that a joint data transmission is performed via at least one beam of the beam group, and may transmit the aggregated CSI to the network. That is, the communication device indicates both the beam group and the aggregated CSI to the network. Thus, the network can schedule the communication device according to more information, and better scheduling performance can be achieved.

Realization of the present invention is not limited to the above description.

In one example, the beam group may include a beam corresponding to a highest CQI in the plurality of CQIs. That is, only the beam group including the beam corresponding to the best CQI is indicated to the network. In one example, the aggregated CSI may include at least one of a RI of the beam group, a PMI of the beam group, and a CQI of the beam group.

Figure 10:
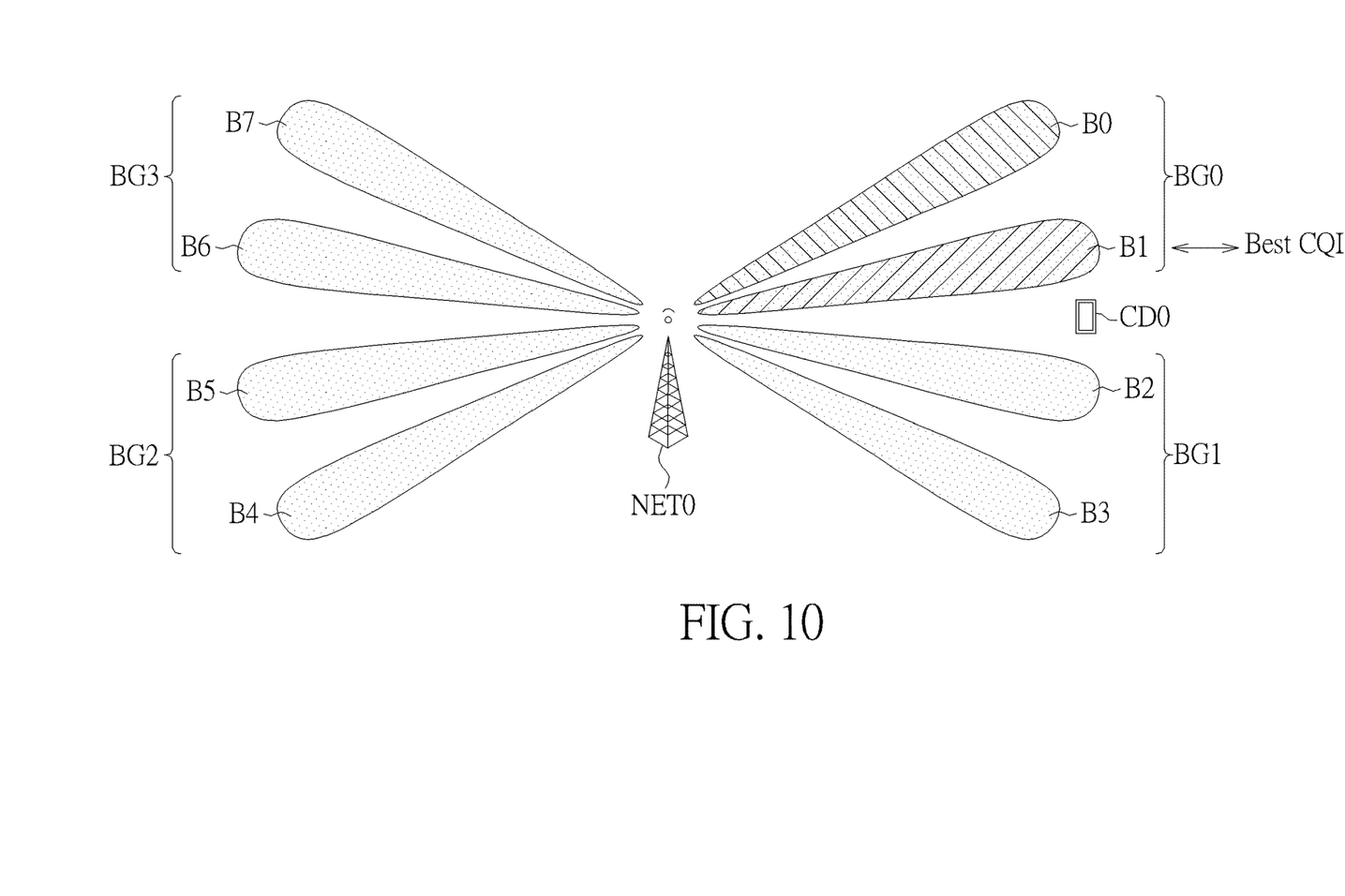
FIG. 10 is a schematic diagram of transmissions of reference signals via beams according to an example of the present invention.

FIG. 10 is a schematic diagram of transmissions of reference signals via beams according to an example of the present invention. In FIG. 10, a network NET0 transmits reference signals to a communication device CD0 via beams B0-B7. The beams B0-B7 are divided into different beam groups BG0-BG3, wherein the beams B0-B1 belong to the beam group BG0, the beams B2-B3 belong to the beam group BG1, the beams B4-B5 belong to the beam group BG2, and the beams B6-B7 belong to the beam group BG3. The communication device CD0 measures the reference signals, and obtains CQIs CQI0-CQI7 according to the reference signals received via the beams B0-B7, respectively. In the present example, the CQI CQI1 is the best CQI among the CQIs CQI0-CQI7. The communication device CD0 selects the beam group BG0 according to the process 90, and transmits a group index of the beam group BG0 to the network NET0. In addition, the communication device CD0 determines an aggregated CSI according to that a joint data transmission is performed via the beams B0-B1 of the beam group BG0, and transmits the aggregated CSI to the network. Thus, the network NET0 knows that the CQI CQI1 is the best CQI and knows the information of the neighboring beams, and is able to schedule the communication device CD0 according to the received information.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and a method for handling channel information. According to the present invention, a communication device repots the channel information to a network efficiently, and overhead for transmitting the channel information is reduced. In addition, the network can schedule the communication device according to more information. Thus, better scheduling performance is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of reporting channel information, comprising:
a storage unit, for storing instructions of:
receiving a plurality of beamformed reference signals transmitted by a network via a plurality of beams, respectively;
obtaining a plurality of channel quality indicators (CQIs) of the plurality of beams according to the plurality of beamformed reference signals;
selecting a beam from the plurality of beams according to the plurality of CQIs;
transmitting a beam index of the beam to the network;
transmitting a channel state information (CSI) of the beam to the network; and
transmitting information of at least one neighboring beam of the beam to the network;
wherein the information of the at least one neighboring beam comprises at least one difference between a CQI of the beam and at least one CQI of the at least one neighboring beam; and
a processing means, coupled to the storage unit, configured to execute the instructions stored in the storage unit.

2. The communication device of claim 1, wherein the beam corresponds to a highest CQI in the plurality of CQIs.

3. The communication device of claim 1, wherein the CSI comprises at least one of a rank indicator (RI) of the beam, a precoding matrix indicator (PMI) of the beam, and a CQI of the beam.

4. The communication device of claim 1, wherein the information of the at least one neighboring beam comprises at least one CSI of the at least one neighboring beam.

5. The communication device of claim 1, wherein the information of the at least one neighboring beam comprises an aggregated CSI determined according to that a joint data transmission is performed via the beam and the at least one neighboring beam.

6. A communication device of reporting channel information, comprising:
a storage unit, for storing instructions of:
receiving a plurality of beamformed reference signals transmitted by a network via a plurality of beams, respectively, wherein the plurality of beams belong to a plurality of beam groups;
obtaining a plurality of channel quality indicators (CQIs) of the plurality of beams according to the plurality of beamformed reference signals;
selecting a beam group from the plurality of beam groups according to the plurality of CQIs;
transmitting a group index of the beam group to the network;
determining an aggregated CSI according to that a joint data transmission is performed via at least one beam of the beam group; and
transmitting the aggregated CSI to the network; and a processing means, coupled to the storage unit, configured to execute the instructions stored in the storage unit.

7. The communication device of claim 6, wherein the beam group comprises a beam corresponding to a highest CQI in the plurality of CQIs.

8. The communication device of claim 6, wherein the aggregated CSI comprises at least one of a rank indicator (RI) of the beam group, a precoding matrix indicator (PMI) of the beam group, and a CQI of the beam group.

* * * * *